(12) United States Patent
Back et al.

(10) Patent No.: US 12,497,487 B2
(45) Date of Patent: Dec. 16, 2025

(54) LOW-DIALECTRIC POLYIMIDE FILM AND METHOD FOR PRODUCING SAME

(71) Applicant: PI Advanced Materials Co., Ltd., Chungcheongbuk-do (KR)

(72) Inventors: Sung-Yul Back, Chungcheongbuk-do (KR); Kil-Nam Lee, Chungcheongbuk-do (KR)

(73) Assignee: PI Advanced Materials Co., Ltd., Chungcheongbuk-do (KR)

( * ) Notice: Subject to any disclaimer, the term of this patent is extended or adjusted under 35 U.S.C. 154(b) by 842 days.

(21) Appl. No.: 17/776,057

(22) PCT Filed: Dec. 2, 2019

(86) PCT No.: PCT/KR2019/016850
§ 371 (c)(1),
(2) Date: May 11, 2022

(87) PCT Pub. No.: WO2021/095975
PCT Pub. Date: May 20, 2021

(65) Prior Publication Data
US 2022/0372225 A1 Nov. 24, 2022

(30) Foreign Application Priority Data

Nov. 13, 2019 (KR) .................. 10-2019-0144759

(51) Int. Cl.
| | | |
|---|---|---|
| C08G 73/10 | (2006.01) | |
| B32B 15/08 | (2006.01) | |
| B32B 27/08 | (2006.01) | |
| B32B 27/20 | (2006.01) | |
| B32B 27/28 | (2006.01) | |
| C08J 5/18 | (2006.01) | |

(52) U.S. Cl.
CPC .......... C08G 73/1021 (2013.01); B32B 15/08 (2013.01); B32B 27/08 (2013.01); B32B 27/20 (2013.01); B32B 27/281 (2013.01); C08J 5/18 (2013.01); *B32B 2307/204* (2013.01); *B32B 2307/41* (2013.01); *B32B 2307/7265* (2013.01); *C08J 2379/08* (2013.01)

(58) Field of Classification Search
CPC .......... C08J 5/18; C08G 73/1021; B32B 15/08
See application file for complete search history.

(56) References Cited

U.S. PATENT DOCUMENTS

| | | | |
|---|---|---|---|
| 2007/0218277 A1* | 9/2007 | Ono | ............................ C09J 7/22 428/355 R |
| 2013/0270487 A1* | 10/2013 | Oku | ................... C08G 73/1042 252/511 |

FOREIGN PATENT DOCUMENTS

| | | | |
|---|---|---|---|
| CN | 1462291 | A | 12/2003 |
| JP | 05-078503 | A | 3/1993 |
| JP | 07-278298 | A | 10/1995 |
| JP | 2013-501130 | A | 1/2013 |
| JP | 2017144730 | * | 8/2017 |
| JP | 2017-177601 | A | 10/2017 |
| JP | 2018-145303 | A | 9/2018 |
| JP | 2021-521284 | A | 8/2021 |
| KR | 10-2007-0012446 | A | 1/2007 |
| KR | 10-1183320 | B | 1/2007 |
| KR | 10-2007-0021263 | A | 2/2007 |
| KR | 10-1392539 | B | 6/2012 |
| KR | 101506611 | * | 3/2015 |
| KR | 10-2015-0037574 | A | 4/2015 |
| KR | 10-2015-0069318 | A | 6/2015 |
| KR | 10-2015-0115461 | A | 10/2015 |
| KR | 10-2017-0118763 | A | 10/2017 |
| KR | 10-2017-0125973 | A | 11/2017 |
| KR | 10-2019-0116725 | A | 10/2019 |
| WO | 2019/195148 | A1 | 10/2019 |

OTHER PUBLICATIONS

International Search Report and Written Opinion from related PCT Application No. PCT/KR2019/016850, dated Dec. 19, 2019, 10 pages.

* cited by examiner

*Primary Examiner* — Gregory Listvoyb
(74) *Attorney, Agent, or Firm* — Brooks, Cameron & Huebsch, PLLC

(57) ABSTRACT

Disclosed herein is provided a method for manufacturing a polyimide film, the method comprising the steps of: preparing a polyamic acid solution; preparing a polyamic add composition by adding 2-3 mole equivalents of a dehydrating agent to the polyamic acid solution; and applying the polyamic acid to a support to form a film, followed by thermosetting the film in a heater.

10 Claims, No Drawings

LOW-DIALECTRIC POLYIMIDE FILM AND METHOD FOR PRODUCING SAME

TECHNICAL FELD

The present disclosure relates to a polyimide film having high heat-resistance, low dielectric, and low optical transmittance properties in combination and a manufacturing method therefor.

BACKGROUND ART

Polyimide (PI), based on highly chemically stable imide rings in a robust aromatic backbone, is a polymeric material that has the highest levels of heat resistance, drug resistance, electric insulation, chemical resistance, and weather resistance among organic materials.

Particularly, with their excellent insulation properties (i.e., excellent electric properties such as low dielectric constants), polyimides enjoy applications as high-performance polymers in diverse fields including electric, electronic, and optical fields.

Recently, flexible, thin-film circuit boards with a high degree of integration have been actively developed with the weight reduction and miniaturization of electronics.

Thin-film circuit boards tend to take advantage of a structure in which a circuit including a metal foil is formed on a highly flexible polyimide film with excellent heat resistance, low-temperature resistance, and insulation properties.

In such thin-film circuit boards, flexible metal-dad laminates predominate, as exemplified by a flexible copper dad laminate (FCCL) in which a thin copper sheet is used as a metal foil. In this regard, polyimide is employed as a protection film, an insulation film, and so on in thin film circuit boards.

With the installation of various functions therein, electronic devices have recently been required to have fast calculation and communication speeds. To meet this requirement, development has been made of thin-film circuit boards that enable high-speed communication at a high frequency.

Realization of high-speed communication at high frequency requires an insulator with a high impedance that allows for the maintenance of electrical insulation even at high frequencies. With the relationship of inverse proportion of an impedance to the frequency and dielectric constant (Dk) formed in an insulator, as low a dielectric constant as possible is advantageous for maintaining insulation at high frequencies.

As for general polyimides, however, their dielectric properties fall short of a level excellent enough to maintain sufficient insulation in high-frequency communication.

In addition, it has been reported that insulators with lower dielectric properties are more likely to reduce undesired stray capacitance and noise generation in a thin-film circuit board, thereby significantly removing causes of communication latency.

Accordingly, a polyimide with low-dielectric properties is now accepted as an important factor above all else in the performance of a thin-film circuit board.

In the case of high-frequency communication, dielectric dissipation through polyimide inevitably occurs. Since dielectric dissipation factor (Df), which is a degree of electrical energy loss in a thin-film circuit board, closely correlates with the signal propagation delay that determines communication speed, maintenance of the dielectric dissipation factor at as low a level as possible is recognized as an important factor for the performance of a thin-film circuit board.

A polyimide film with a higher moisture content is more apt to increase in dielectric constant and dielectric dissipation factor. With excellent intrinsic properties, polyimide films are suitable as materials for thin-film circuit boards. However, polyimide films may be relatively vulnerable to moisture due to the imide groups with polarity and as such, may be decreased in insulation properties.

Therefore, there is a need for developing a polyimide film that retains certain levels of characteristic mechanical, thermal, low-optical transmittance, and anti-chemical properties thereof and shows dielectric properties, particularly, a low-dielectric dissipation factor.

DISCLOSURE

Technical Problem

Provided to solve the problems are a polyimide film having low dielectric, low hygroscopic, and low optical transmittance properties in combination and a manufacturing method therefor.

To this end, the present disclosure substantially aims to provide exemplary embodiments.

Technical Solution

To accomplish the aims, an aspect of the present discourse provides a method for manufacturing a polyimide film, the method including the steps of:

preparing a polyamic acid solution;

preparing a polyamic acid composition by adding 2-3 mole equivalents of a dehydrating agent to the polyamic acid solution; and applying the polyamic acid to a support to form a film, followed by thermosetting the film in a heater.

In the step of preparing a polyamic acid composition, an imidizing catalyst may be additionally added in an amount of 0.5-2 mole equivalents to the polyamic acid solution.

The polyamic acid solution may contain an acid dianhydride component including 3,3',4,4'-biphenyltetracarboxylic dianhydride (BPDA), and pyromellitic dianhydride (PMDA) and a diamine component including m-tolidine, 4,4'-oxydianiline (ODA), and p-phenylenediamine (PPD).

Based on a total of 100% by mole of the acid dianhydride component, 3,3',4,4'-biphenyltetracarboxylic dianhydride may be used at a content of 30% by mole to 50% by mole and pyromellitic dianhydride may be used at a content of 50% by mole to 70% by mole.

Based on a total of 100% by mole of the diamine component, m-tolidine may be used at a content of 60% by mole to 80% by mole for, p-phenylenediamine may be used at a content of from 10% by mole to 25% by mole, and 4,4'-oxydianiline (ODA) may be used at a content of from 10% by mole to 25% by mole.

The dehydrating agent may be an acetic anhydride and the imidizing catalyst may be at least one selected from the group consisting of isoquinoline, S-picoline, pyridine, imidazole, 2-imidazole, 1,2-dimethylimidazole, 2-phenylimidazole, and benzimidazole.

In the thermosetting step, the thermosetting may be carried out at 450-520° C. for 3 minutes (exclusive) to 6 minutes (inclusive).

The polyimide film may include a copolymer composed of two or more blocks.

Another aspect of the present disclosure provides a polyimide film manufactured by the manufacturing method.

The polyimide film may have a moisture absorption rate of 0.3% or less and a dielectric dissipation factor (Df) of 0.003 or less.

In addition, the polyimide film may have an optical transmittance of 25% or less.

A further aspect of the present disclosure provides a multilayer film including the polyimide film and a plastic resin layer, and a flexible metal clad laminate including the polyimide film and an electroconductive metal foil.

A yet further aspect of the present disclosure provides an electronic part comprising the flexible metal dad laminate.

Advantageous Effects

As stated in the foregoing, the polyimide film comprising specific components at specific ratios, manufactured by the method of the present disclosure, exhibits low dielectric, low hygroscopic, and low optical transmittance properties in combination, thus finding applications in various fields demanding such properties, especially, electronic parts such as flexible metal-dad laminates, etc.

BEST MODE FOR CARRYING OUT THE INVENTION

Below, a detailed description will be given of the present disclosure in the order of "method for manufacturing a polyimide film" and "polyimide film".

Terms and words used in the present specification and claims should not be limited to general or dictionary meanings, but are to be construed as meanings and concepts meeting the technical ideas of the present disclosure based on a principle that the present inventors may appropriately define the concepts of terms in order to describe their inventions in the best mode.

Therefore, the configurations of embodiments described herein are only one of the most preferred embodiments of the present disclosure and do not represent all the technical spirits of the present disclosure. Thus, it should be understood that there may be various equivalents and modification examples that can replace them at the time of filing the present application.

Singular forms as used herein include plural forms unless the context clearly indicates otherwise. It should be understood that the term "comprise", "includes", or "have", etc., as used herein specifies the presence of implemented features, numerals, steps, components, or a combination thereof, but does not preclude the presence or addition of one or more other features, numerals, steps, components, or a combination thereof.

It should be understood that when an amount, concentration, or other value or parameter as used herein is given as an enumeration of a range, a preferable range, or preferable upper and lower values, all ranges formed with any upper limit or preferable values of any one pair and any lower limit or preferable values of any one pair are specifically disclosed, regardless of whether the range is disclosed separately.

When a range of numerical values is referred to herein, the range is intended to include endpoints thereof and all integers and fractions within that range, unless stated otherwise. It is intended that the scope of the present disclosure is not limited to specific values recited when the range is defined.

As used herein, the term "acid dianhydride" is intended to encompass precursors or derivatives thereof which may not fall within the scope of dianhydrides from a point of technical view, but nevertheless will react with diamine to form polyamic acids which can be then converted into polyimides.

As used herein, the term "diamine" is intended to encompass precursors or derivatives thereof which may not fall within the scope of diamines from a point of technical view, but nevertheless will react with dianhydride to form polyamic acids which can be then converted into polyimides.

A method for manufacturing a polyimide film according to the present disclosure comprises the steps of: preparing a polyamic acid solution; preparing a polyamic acid composition by adding 2-3 mole equivalents of a dehydrating agent to the polyamic acid solution; and applying the polyamic acid to a support to form a film, followed by thermosetting the film in a heater.

In the present disclosure, the preparation of a polyamic acid may be achieved by (1) a method in which polymerization is carried out by adding the entire amount of a diamine component to a solvent and then a substantially equimolar amount of an acid dianhydride component, (2) a method in which the polymerization is carried out by adding the entire amount of an acid dianhydride component to a solvent and then a substantially equimolar amount of a diamine component, (3) a method in which the polymerization is carried out by: adding some of a diamine component to a solvent; mixing some of an acid dianhydride component at a ratio of about 95-105% by mole relative to the reaction component; and adding the residual diamine component and subsequently the residual acid dianhydride component to make the respective amounts the diamine component and the acid dianhydride component substantially equimolar, (4) a method in which the polymerization is carried out by: adding an acid dianhydride component to an organic solvent; mixing some of a diamine component at a ratio of 95-105% by mole relative to the reaction component; and adding a different acid dianhydride component and subsequently the residual diamine component to make a total of the amounts of the acid dianhydride components substantially equimolar to the total amount of the diamine component, or (5) a method in which the polymerization is carried out by: reacting some of a diamine component with some of an acid dianhydride component in a solvent where any one of the diamine component and the acid dianhydride component is used in excess to form a first composition; reacting some of the diamine component with some of the acid dianhydride component in a different solvent where any one of the diamine component and the acid dianhydride component is used in excess to form a second composition; and mixing the first and the second composition, wherein when the first composition is formed by using the diamine component in excess, the second composition is formed by using the dianhydride in excess or when the first composition is formed by using the acid dianhydride component in excess, the second composition is formed by using the diamine component in excess, whereby the total amount of the diamine component is substantially equimolar to the total amount of the acid dianhydride component.

However, the polymerization method is not limited to those given above, the first to the third polyamic acid may be prepared using any method known in the art.

A polyimide film may be manufactured using a thermal imidization process, a chemical imidization process, or a composite imidization process employing thermal and chemical imidization in combination.

As used herein, the term "thermal imidization process" refers to a process in which an imidization reaction is induced using a heat source, such as hot wind or an infrared dryer, without a chemical catalyst.

According to a thermal imidization process, the gel film is thermally treated at temperatures varying from 100 to 600° C. to imidize amic acid groups present in the gel film, particularly at temperatures from 200 to 500° C., and more particularly at temperatures from 300 to 500° C.

According to a thermal imidization process, the gel film is thermally treated at temperatures varying from 100 to 600° C. to imidize amic acid groups present in the gel film, particularly at temperatures from 200 to 500° C., and more particularly at temperatures from 300 to 500° C.

During the formation of the gel film, the amic acid groups may be imidized in part (about 0.1 to 10% by mole). In this regard, the polyamic add composition may be dried at temperatures varying from 50° C. to 200° C. This process may also fall within the scope of the thermal imidization process.

For a chemical imidization process for manufacture of a polyimide film, a dehydrating agent and an imidizing agent are employed according to a method known in the art.

In the present disclosure, the polyimide film may be manufactured by a composite imidization process in which a dehydrating agent and an imidizing catalyst is added to a polyamic acid solution which is then heated to afford a polyimide.

When the dehydrating agent is added at less than 2 molar equivalents in the polyimide film manufacturing method of the present disclosure, the film is difficult to form. More than 3 molar equivalent of the dehydrating agent increases dielectric dissipation factor, moisture absorption rate, and optical transmittance values, which are far from away the desired low dielectric, low moisture absorption, and low optical transmittance properties for the polyimide film.

In the step of preparing a polyamic composition, 0.5-2 molar equivalents of an imidizing catalyst may be additionally added to the polyamic acid solution.

The dehydrating agent functions to dehydrate a polyamide acid to induce ring closure as exemplified by aliphatic acid anhydride, aromatic acid anhydrides, N,N'-dialkyl carbodiimide, lower aliphatic halides, halogenated lower aliphatic acid anhydrides, arylsulfonic acid dihalides, thionyl halides, etc.

Particularly preferred is acetic anhydride.

Examples of the imidizing catalyst include aliphatic tertiary amines, aromatic tertiary amines, and heterocylic tertiary amines. So long as it is a component which accelerates the dehydrating and ring-closing effect of the dehydrating agent on the polyamide acid, any catalyst may be used.

Among others, the imidizing catalyst is preferably at least one selected from the group consisting of isoquinoline, β-picoline, pyridine, imidazole, 2-imidazole, 1,2-dimethylimidazole, 2-phenylimidazole, and benzimidazole.

In the method for manufacturing a polyimide film according to the present disclosure, the polyamic acid solution may contain an add dianhydride component including 3,3',4,4'-biphenyltetracarboxylic anhydride (BPDA) and pyromellitic dianhydride (PMDA), and a diamine component including m-tolidine, 4,4'-oxydianiline (ODA), and para-phenylene diamine (PPD).

In some embodiments, the content of 3,3',4,4'-biphenyltetracarboxylic anhydride may be in the range of 30% by mole to 50% by mole and the content of pyromellitic dianhydride may be in the range of 50% by mole to 70% by mole, based on a total of 100% by mole of the acid dianhydride component.

In some particular embodiments, a content may be set forth to range from 35% by mole to 45% by mole for the 3,3',4,4'-biphenyltetracarboxylic anhydride and from 55% by mole to 65% by mole for the pyromellitic dianhydride, based on a total of 100% by mole of the acid dianhydride.

In some embodiments, the content of m-tolidine may be in the range of 60% by mole to 80% by mole and the content of para-phenylene diamine may be in the range of from 10% by mole to 25% mole, and the content of 4,4'-oxydianiline may be in the range of 10% by mole to 25% by mole, based on a total of 100% by mole of the diamine component.

In some particular embodiments, a content may be set forth to range from 65% by mole to 75% by mole for m-tolidine, from 10% by mole to 20% by mole for the para-phenylene diamine, and from 10% by mole to 20% by mole for the 4,4'-oxydianiline, based on a total of 100% by mole of the diamine component.

In the present disclosure, the polyimide chain derived from 3,3',4,4'-biphenyltetracarboxylic dianhydride has the structure of so-called charge transfer complex (CTC), that is, an ordered linear structure in which electron donors and electron acceptors are positioned in proximity to each other, with an intermolecular interaction enhanced therebetween.

Being effective of preventing the formation of hydrogen bonds with moisture, such a structure has a decreasing influence on moisture absorption rate and as such, can bring about a maximum effect of decreasing the hygroscopic property of the polyimide film.

In some particular embodiments, the polyamic acid solution may further contain pyromellitic dianhydride as a dianhydride component. As a dianhydride component with a relatively stout structure, pyromellitic dianhydride may be preferred due to conferring proper resilience on the polyimide film.

For the polyimide film to meet pertinence in terms of both resilience and moisture absorption rate, the content ratio of the dianhydrides is particularly important. For instance, a lower content ratio of 3,3',4,4'-biphenyltetracarboxylic dianhydride makes it more difficult to achieve a low moisture absorption rate due to the CTC structure.

The aromatic moiety of the acid dianhydride component is accounted for by two benzene rings in 3,3',4,4'-biphenyltetracarboxylic dianhydride, but by one benzene ring in pyromellitic dianhydride.

In the acid dianhydride component, an increase in the content of pyromellitic dianhydride is construed to be an increase in the number of imide groups within the molecule in view of the same molecular weight, indicating that the proportion of the imide group derived from pyromellitic dianhydride in the polyimide chain is relatively increased, compared to that of the imide group derived from 3,3',4,4'-biphenyltetracarboxylic dianhydride.

Accordingly, an increased content of pyromellitic dianhydride is also understood as a relative increase of the imide group in the entire polyimide film, leading to difficulty in expecting low moisture absorption rates.

In contrast, a reduced content of pyromellitic dianhydride accounts for a relative reduction in a component responsible for the stout structure and thus may decrease the mechanical properties of the polyimide to an undesirable level.

For this reason, when contents of 3,3',4,4'-biphenyltetracarboxylic dianhydride exceed the upper limits of the ranges set forth above therefor, the polyimide film has degraded mechanical properties and cannot attain heat resistance at a level sufficient to manufacture a flexible metal clad laminate.

When 3,3',4,4'-biphenyltetracarboxylic dianhydride is used at contents lower than the lower limits of the ranges set respectively forth therefor or when pyromellitic dianhydride is used at a content higher than the upper limit of the range set forth therefor, the polyimide film cannot achieve proper levels of dielectric constant, dielectric dissipation factor, and moisture absorption rate.

Having methyl groups, which are hydrophobic, m-tolidine contributes to the low hygroscopic property of the polyimide film. When m-tolidine is used in an amount less than the lower limit of the range, a desired low level of moisture absorption rate cannot be attained. The low moisture absorption rate attributable to m-tolidine also makes a contribution to the low dielectric dissipation factor of the polyimide film.

The polyimide film may a block copolymer composed of two or more blocks and particularly two blocks.

In the method for manufacturing a polyimide film according to the present disclosure, the thermosetting step is carried at a temperature of 450-520° C. for 3 minutes (exclusive) to 6 minutes (inclusive).

In addition, when the thermosetting time is less than 3 minutes, the polyimide film increases in all moisture absorption rate, the dielectric dissipation factor, and optical transmittance. For a thermosetting time longer than 6 minutes, the film is carbonized at the surface thereof and increases in dielectric dissipation factor, failing to attain desired properties.

For the thermosetting, an IR-curing furnace may be used.

In the present disclosure, the polymerization methods for polyamic acid stated above is defined as random polymerization methods. The polyimide film manufactured from the polyamic acid prepared in the aforementioned processes may be preferably applied in light of maximizing the present disclosure's effect of decreasing dielectric dissipation factor (Df) and moisture absorption rate in the polyimide film.

However, the polymer chains prepared by the polymerization methods described in the foregoing have relatively short repeating units and thus are insufficient to exhibit excellent properties that the polyimide chains derived from dianhydride component retain. Preferably available in the present disclosure may thus be a block polymerization method.

So long as it can dissolve polyamic acid, any solvent for use in polyamic acid synthesis can be used without limitations. Preferred is an amide-based solvent.

In detail, the solvent may be an organic polar solvent, particularly a polar aprotic solvent. For example, the solvent may be at least one selected from the group consisting of N,N-dimethylformamide (DMF), N,N-dimethylacetamide, N-methyl-pyrrolidone (NMP), gamma butyrolactone (GBL), and diglyme, but with no limitations thereto. The solvents may be used alone or in combination, as necessary.

In particular some embodiments, the solvent may include N,N-dimethylformamide and N,N-dimethylacetamide.

Moreover, with the aim of enhancing various properties of the film, such as slidability, thermal conductivity, corona resistance, loop hardness, etc., a filler may be added in the polyamic acid preparation processes. Particular limitations are not imparted to the filler added. Examples of the filler include silica, titanium oxide, alumina, silicon nitride, calcium hydrogen phosphate, calcium phosphate, and mica.

The particle diameter of the filler is not particularly limited, but is determined according to desirable properties of the film and types of the filler to be added. Generally, the filler has a mean particle diameter of 0.05 to 100 μm, particularly 0.1 to 75 μm, more particularly 0.1 to 50 μm, even more particularly 0.1 to 25 μm.

When fillers have a particle diameter less than the lower limit of the range, modification effects thereof are little obtained. With a particle diameter exceeding the upper limit of the range, the fillers may greatly degrade the surface property or mechanical property.

The amount of the filler is not particularly limited, but may be determined according to desirable properties of the film and particle sizes of the filler. Generally, the filler is used in an amount of 0.01 to 100 parts by weight, particularly 0.01 to 90 parts by weight, and more particularly 0.02 to 80 parts by weight, based on 100 parts by weight of the polyimide film.

When the filler is used in an amount less than the lower limit of the range, modification effects thereof are little obtained. When used in an amount higher than the upper limit of the range, the filler is apt to greatly damage mechanical properties of the film. So long as it is known in the art, any method of adding the filler may be used without particular limitations.

The polyimide film manufactured by the manufacturing method may have a moisture absorption rate of 0.3% or less and a dielectric dissipation factor of 0.003 or less.

In a particular embodiment, the polyimide film may have a moisture absorption rate of 0.27% or less and a dielectric dissipation factor of 0.0028 or less.

Moreover, the polyimide film manufactured by the manufacturing method may have an optical transmittance of 25% or less.

In a particular embodiment, the polyimide film may have an optical transmittance of 22% or less.

In this regard, not only can the polyimide film meeting all the dielectric dissipation factor (Df), the glass transition temperature, and the moisture absorption rate be used as an insulation film for flexible metal clad laminates, but also the flexible metal dad laminates prepared therewith can guarantee insulation stability and minimize signal propagation delay even when they are used in electrical signal transfer circuits for transferring signals at a frequency of 10 GHz or higher.

A polyimide film that meets the conditions set in the foregoing has not yet been known. Below, dielectric dissipation factor (DF) and moisture absorption rate will be elucidated in detail.

<Dielectric Dissipation Factor>

As used herein, the term "dielectric dissipation factor" means the degree of electrical energy loss by a dielectric substance (or insulator) as a result of the change of the electrical energy in the insulator to heat energy by vibration of the molecules when an alternating current field is applied thereto.

A value of dielectric dissipation factor is an index of the easiness of charge loss (dielectric loss) and is typically used as a standard for the degree of electrical loss. With a higher dielectric dissipation factor, an insulator is more prone to losing charges. On the other hand, the lower the dielectric dissipation factor is, the less the charges are likely to be lost. That is, the dielectric dissipation factor explains how much electrical loss occurs. Thus, given a low dielectric dissipation factor, the signal propagation delay attributable to electrical energy loss is relieved, with the resultant maintenance of a fast communication speed.

This condition is strongly demanded for a polyimide film used as an insulation film. The polyimide film according to the present disclosure may have a dielectric dissipation factor of 0.003 or less under a very high frequency, such as 10 GHz.

<Moisture Absorption Rate>

The moisture absorption rate is a ratio of the moisture contained in a material. As a rule, a high moisture absorption rate is known to lead to an increase in dielectric constant and dielectric dissipation factor.

Water has a dielectric constant of 100 or higher in the solid state, about 80 in the liquid state, and 1.0059 in the vapor state.

That is, after being absorbed into a polyimide film, water vapor exists in a liquid state, thereby exceptionally increasing the dielectric constant and dielectric dissipation factor of the polyimide film.

Even a trace amount of water, if absorbed, can greatly change the dielectric constant and dielectric dissipation factor in the polyimide film.

The polyimide film according to the present disclosure may have a moisture absorption rate of 0.3% by weight. The attainment of such a low moisture absorption rate is attributed to the configurational characteristics of the polyimide film according to the present disclosure.

The non-polar moiety in the molecular structure of the polyimide film according to the present disclosure is considered to be responsible for the low moisture absorption rate.

The present disclosure provides a multilayer film comprising the polyimide film and a thermoplastic resin layer, and a flexible metal clad laminate comprising the polyimide film and an electrically conductive metal foil.

As the thermoplastic resin layer, for example, a thermoplastic polyimide resin layer may be available.

As stated in the foregoing, the polyimide film according to the present disclosure satisfies all the conditions set forth above and as such, cannot only be used as an insulation film for flexible metal clad laminates, but also can guarantee insulation stability and minimize signal propagation delay even at a high frequency.

No particular limitations are imparted to the metal foil used. For use in the flexible metal clad laminate of the present disclosure which is applied to electronic or electric devices, the metal foil may include, for example, copper or a copper alloy, stainless steel or an alloy thereof, nickel or nickel alloy (inclusive of 42 alloy), or aluminum or an aluminum alloy.

Flexible metal dad laminates usually employ copper foil such as rolled copper foil, electrolytic copper foil, etc. In this disclosure, copper foil may also be employed. In addition, the copper foil may be coated with an anti-corrosive layer, a heat resistance layer, or an adhesive layer.

In the present disclosure, the metal foil is not limited to particular thicknesses, but should be thick enough to exhibit a sufficient performance according to its use.

The flexible metal clad laminate according to the present disclosure may have a structure in which a metal foil is laminated on one surface of the polyimide film or on a thermoplastic polyimide containing adhesive layer attached to one surface of the polyimide film.

Also, the present disclosure provides an electronic part comprising the flexible metal clad laminate as an electrical signal transfer circuit. The electrical signal transfer circuit may transfer signals at a frequency of at least 2 GHz, particularly at least at a frequency of at least 5 GHz, and more particularly at a frequency of at least 10 GHz.

The electronic part may include, for example, a communication circuit for mobile terminals, computers, and aerospace flights, but is not limited thereto.

MODE FOR CARRYING OUT THE INVENTION

Below, a better understanding of the present disclosure may be obtained via the following examples which are set forth to illustrate, but are not to be construed as limiting, the present disclosure.

Example 1

To a 500-ml reactor equipped with a stirrer and nitrogen introduction/release tubes was input NMP while introducing nitrogen thereto. After the temperature of the reactor was set to be 30° C., a diamine component including 70% by mole of m-tolidine, 15% by mole of para-phenylene diamine, and 15% by mole of 4,4'-oxydianiline and an acid dianhydride component including 40% by mol of 3,3',4,4'-biphenyltetracarboxylic anhydride and 60% by mole of pyromellitic dianhydride were input. After being observed to be completely dissolved, the components were stirred for 120 minutes in a nitrogen atmosphere, while heating to 40° C., to afford a polyamic acid having a viscosity of 200,000 cp at 23° C.

To the polyamic acid (PAA) solution, 1 molar equivalent of isoquinoline (IQ), which is an imidizing catalyst, was added, together with 2 molar equivalents of acetic anhydride and DMF.

Afterwards, using a spin coater, a glass substrate was coated with the degassed polyimide precursor composition and dried at 120° C. for 30 minutes in a nitrogen atmosphere to give a gel film. This gel film was imidized by thermosetting for 5 minutes at 500° C. in an IR furnace to afford a polyimide film.

Subsequently, the polyimide film was released from the glass substrate by dipping into distilled water. The polyimide film thus manufactured was 15 μm thick as measured by an electric Film thickness tester (Anritsu)

Examples 2 and 3 and Comparative Examples 1 to 8

Polyimide films were manufactured in the same manner as in Example 1, with the exception that the molar equivalent of acetic anhydride and the thermosetting time were changed as shown in Table 1, below.

TABLE 1

| No. | IQ (vs. PAA ratio) | AA (vs. PAA ratio) | Thermosetting time (min) |
|---|---|---|---|
| Ex. 1 | 1 | 2 | 5 |
| Ex. 2 | 1 | 2.4 | 5 |
| Ex. 3 | 1 | 2.8 | 5 |
| C. Ex. 1 | 1 | 1.6 | 5 |
| C. Ex. 2 | 1 | 3.4 | 5 |
| C. Ex. 3 | 1 | 1.6 | 3 |
| C. Ex. 4 | 1 | 2 | 3 |
| C. Ex. 5 | 1 | 2.4 | 3 |
| C. Ex. 6 | 1 | 2.8 | 3 |
| C. Ex. 7 | 1 | 3.4 | 3 |
| C. Ex. 8 | 1 | 2 | 7 |

<Test Example 1> Assay for Dielectric Dissipation Factor, Moisture Absorption Rate, and Optical Transmittance Each of the polyimide films manufactured in Examples 1 to 3 and Comparative Examples 1 to 8 was measured for dielectric dissipation factor, moisture absorption rate, and optical transmittance, and the results are summarized in Table 2, below.

(1) Measurement of Dielectric Dissipation Factor

After the flexible metal dad laminates were left for 72 hours, the dielectric dissipation factor (Df) was measured using the impedance analyzer Agilent 4294A.

(2) Measurement of Moisture Absorption Rate

A moisture absorption rate was measured according ASTMD 570. In this regard, a specimen was made by cutting the polyimide film into a square dimension of 5 cm×5 cm and dried for 24 hours in an oven maintained at 50° C. before being weighed. Then, the specimen was immersed in water at 23° C. for 24 hours and weighed. The difference in weight was expressed as %.

(3) Measurement of Optical Transmittance

Using a UV spectrophotometer (Varian, Cary100), mean optical transmittance at 380-780 nm was measured.

TABLE 2

| No. | Df | Moisture Absorption Rate (%) | Optical Transmittance (%) | Note |
|---|---|---|---|---|
| Ex. 1 | 0.0024 | 0.21 | 18 | — |
| Ex. 2 | 0.0026 | 0.25 | 19 | — |
| Ex. 3 | 0.0028 | 0.27 | 22 | — |
| C. Ex. 1 | — | — | — | unable to form film |
| C. Ex. 2 | 0.0035 | 0.37 | 27 | — |
| C. Ex. 3 | — | — | — | unable to form film |
| C. Ex. 4 | 0.0035 | 0.37 | 27 | — |
| C. Ex. 5 | 0.0038 | 0.42 | 29 | — |
| C. Ex. 6 | 0.0038 | 0.44 | 30 | |
| C. Ex. 7 | 0.0040 | 0.47 | 32 | |
| C. Ex. 8 | 0.0052 | 0.63 | 35 | |

As seen in Table 2, all of the polyimide films manufactured in the Examples of the present disclosure exhibited significantly low dielectric dissipation rates of less than 0.003 and moisture absorption rates of 0.3 or less.

In addition, the films were all measured to have an optical transmittance of 25% or less.

It is understood that the results are attributed to the components and composition ratios (inter alia, dehydrating agent and imidizing catalyst) specified in this disclosure and contents of individual components play critical roles.

On the other hand, the polyimide films of Comparative Examples 1 to 8 which are different in component from the Examples were measured to be higher in terms of all dielectric dissipation factor, moisture absorption rate, and optical transmittance than those of the Examples. Therefore, the polyimide films of Comparative Examples are predicted to be difficult to use in electronic parts in which signal transmission is performed at a high frequency in gigabytes.

Although the present disclosure has been described with reference to the embodiments thereof, it should be understood by those skilled in the art that various applications and modifications may be made without departing from the scope of the present disclosure.

INDUSTRIAL APPLICABILITY

The present disclosure provides a polyimide film composed of specific compositions of specific components and a manufacturing method therefor. With low dielectric, low hygroscopic, and low optical transmittance properties in combination, the polyimide can find advantageous applications in various fields demanding such properties, especially electronic parts such as flexible metal clad laminates, etc.

The invention claimed is:

1. A method for manufacturing a polyimide film, the method comprising the steps of:
preparing a polyamic acid solution;
preparing a polyamic acid composition by adding 2-3 mole equivalents of a dehydrating agent to the polyamic acid solution; and
applying the polyamic acid to a support to form a film, followed by thermosetting the film in a heater, wherein the polyamic acid solution contains:
an acid dianhydride component including 3,3',4,4'-biphenyltetracarboxylic dianhydride (BPDA), and pyromellitic dianhydride (PMDA); and
a diamine component including m-tolidine, 4,4'-oxydianiline (ODA), and p-phenylenediamine (PPD), wherein 3,3',4,4'-biphenyltetracarboxylic dianhydride is used at a content of 30% by mole to 50% by mole and pyromellitic dianhydride is used at a content of 50% by mole to 70% by mole, based on a total of 100% by mole of the acid dianhydride component; and
wherein m-tolidine is used at a content of 60% by mole to 80% by mole for, p-phenylenediamine is used at a content of from 10% by mole to 25% by mole, and 4,4'-oxydianiline (ODA) is used at a content of from 10% by mole to 25% by mole, based on a total of 100% by mole of the diamine component.

2. The method of claim 1, wherein an imidizing catalyst is additionally added in an amount of 0.5-2 mole equivalents to the polyamic acid solution in the step of preparing a polyamic acid composition.

3. The method of claim 1, wherein the dehydrating agent is acetic anhydride.

4. The method of claim 2, wherein the imidizing catalyst is at least one selected from the group consisting of isoquinoline, β-picoline, pyridine, imidazole, 2-imidazole, 1,2-dimethylimidazole, 2-phenylimidazole, and benzimidazole.

5. The method of claim 1, wherein the thermosetting is carried out at 450-520° C. for 3 minutes (exclusive) to 6 minutes (inclusive).

6. The method of claim 1, wherein the polyimide film comprises a copolymer composed of two or more blocks.

7. A polyimide film, comprising a polyimide that contains, as polymerized units: manufactured by the method of claim 1 an acid dianhydride component including 3,3',4,4'-biphenyltetracarboxylic dianhydride (BPDA) and pyromellitic dianhydride (PMDA); and a diamine component including m-tolidine, 4,4'-oxydianiline (ODA), and p-phenylenediamine (PPD), wherein, based on a total of 100 mol % of the acid dianhydride component, 3,3',4,4'-biphenyltetracarboxylic dianhydride is present in an amount of 30 mol % to 50 mol %, and pyromellitic dianhydride is present in an amount of 50 mol % to 70 mol %; and wherein, based on a total of 100% by mole of the diamine component, m-tolidine is present in an amount of of 60% by mole to 80% by mole, and p-phenylenediamine is present in an amount of 10% by mole to 25% by mole, and 4,4'-oxydianiline (ODA) is present in an amount of 10% by mole to 25% by mole.

8. The polyimide film of claim 7, wherein the polyimide film has a moisture absorption rate of 0.3% or less and a dielectric dissipation factor (Df) of 0.003 or less.

9. The polyimide film of claim 7, wherein the polyimide film has an optical transmittance of 25% or less.

10. A multilayer film, comprising the polyimide film of claim 7 and a thermoplastic resin layer.

* * * * *